No. 673,342. Patented Apr. 30, 1901.
W. G. SCHAEFFER.
BACK PEDALING BRAKE.
(Application filed Sept. 30, 1899.)
(No Model.) 2 Sheets—Sheet 1.
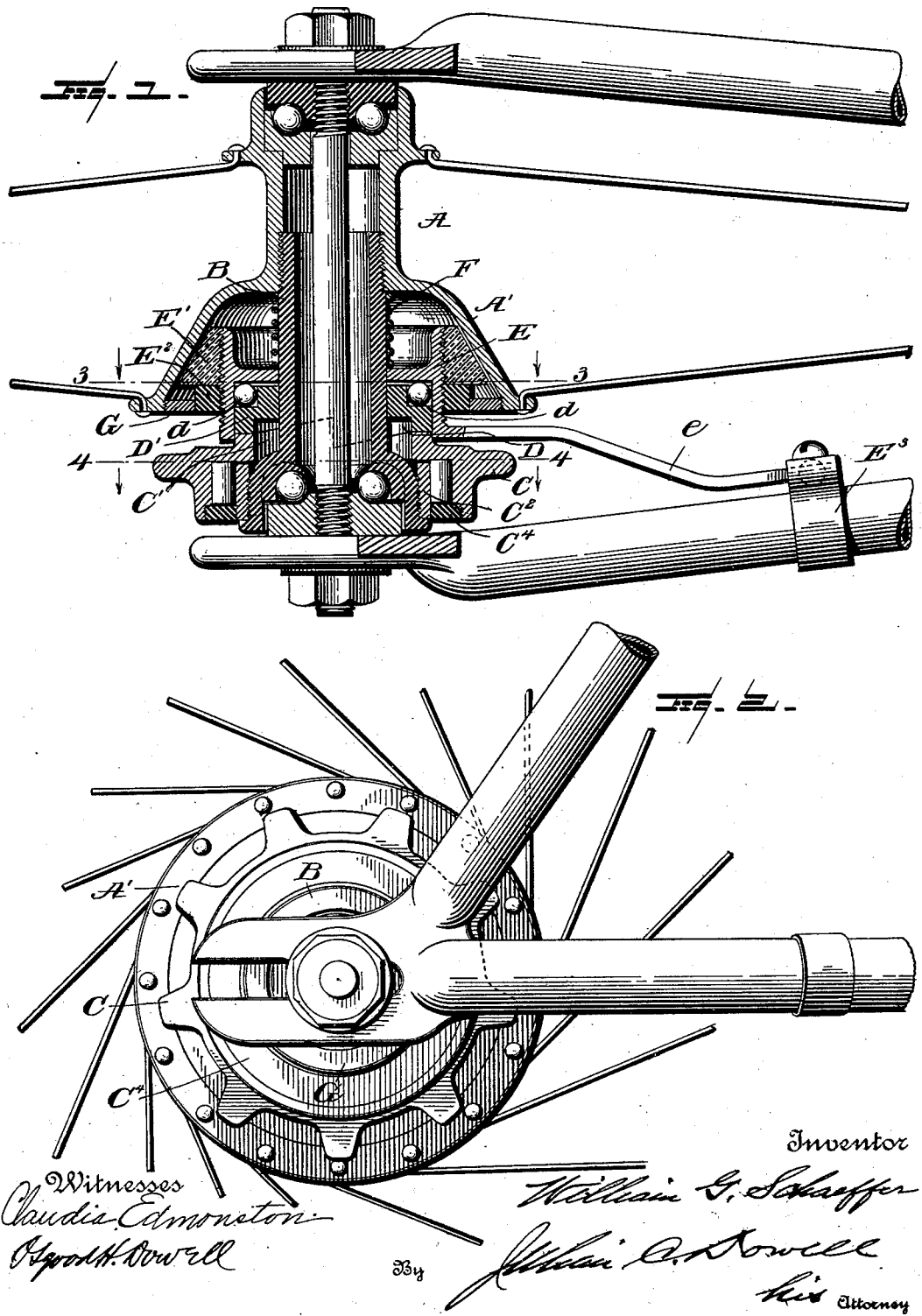

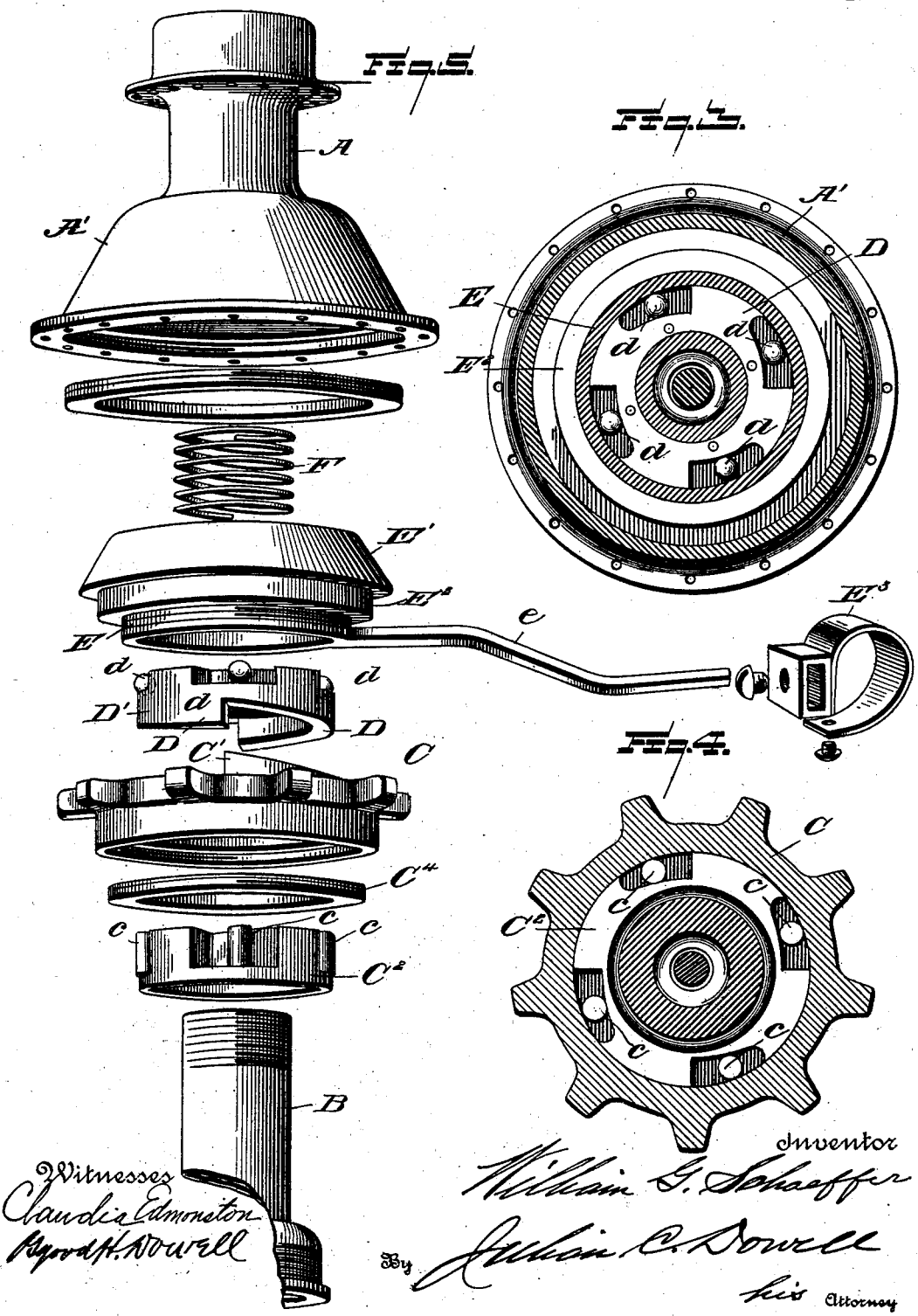

UNITED STATES PATENT OFFICE.

WILLIAM GEORGE SCHAEFFER, OF READING, PENNSYLVANIA, ASSIGNOR OF FIFTY-ONE ONE-HUNDREDTHS TO JAMES C. REBER, OF SAME PLACE.

BACK-PEDALING BRAKE.

SPECIFICATION forming part of Letters Patent No. 673,342, dated April 30, 1901.

Application filed September 30, 1899. Serial No. 732,204. (No model.)

*To all whom it may concern:*

Be it known that I, WILLIAM GEORGE SCHAEFFER, a citizen of the United States, residing at Reading, in the county of Berks and State of Pennsylvania, have invented certain new and useful Improvements in Back-Pedaling Brakes; and I do hereby declare the following to be a full, clear, and exact description of the invention, such as will enable others skilled in the art to which it appertains to make and use the same.

This invention relates to improvements in bicycles, and more particularly to "back-pedaling" brakes and coasting devices therefor, the primary object being to provide a combined clutch and brake device applied to the rear hub of the machine, so that the rider may propel the machine forward at will or coast with his feet upon the pedals or, by slightly back-pedaling, apply the brake directly to the hub of the rear wheel.

The invention will first be hereinafter more particularly described with reference to the accompanying drawings, which form a part of this specification, and then pointed out in the claims at the end of the description.

In the drawings, Figure 1 is a longitudinal section of the hub of the rear wheel of a bicycle with my improved brake and coaster applied thereto. Fig. 2 is a front elevation thereof. Fig. 3 is a section on the line 3 3 of Fig. 1, showing the inner clutch and brake mechanism; and Figs. 4 and 5 are details.

The hub is preferably constructed in two parts A and B. Part A contains the left-hand ball-case and is provided with a large bell-shaped flange A' on its inner end, and part B contains the right-hand ball-case and has its inner end threaded and screwed into a correspondingly-threaded socket in the part A at the base of the flange A'.

Within the bell-shaped flange A' and loosely surrounding the part B is a sleeve E, which is exteriorly threaded and is provided with an arm $e$, which projects outside of and beyond the flange A' and is loosely connected to one of the frame-braces in any suitable manner, as by a yoke $E^3$, so as to prevent sleeve E rotating with the hub, but permitting the sleeve to be moved longitudinally thereon. On the inner end of this sleeve is screwed a beveled brake-ring E', which is made of any suitable hard wearing substance, such as fiber, the brake-ring being reinforced by a jam-nut $E^2$ on the sleeve, which nut is provided for the purpose of taking up wear of the brake-ring. The sleeve is normally pressed outward and away from the flange A' by a spring F, as shown. The sleeve is interiorly bored out to receive a clutch-ring D', which is provided with a series of beveled recesses containing movable clutch-pieces $d$, (preferably balls,) adapted to bind against the sleeve E when the clutch-ring is rotated backward. To the clutch-ring is also fastened a cam-ring, which is provided with segmental cams D, that are adapted to engage opposed segmental cams C' on the side of the sprocket C, which is fitted over a clutch-ring $C^2$, screwed onto the outer end of part hub B, as shown. This clutch-ring $C^2$ is provided with tapered recesses containing clutch-pieces $c$, (which may be rollers,) adapted to engage the inner surface of the sprocket C when the latter is turned in the direction to propel the wheel forward. The clutch-pieces $c$ may be confined between the clutch-ring $C^2$ and sprocket C by means of an annulus $C^4$, screwed into the outer end of the sprocket, as shown, so as to exclude dust therefrom. Similarly an annulus G may be screwed into the open mouth of the flange A', so as to exclude dust from the brake-surface.

While I prefer the form of clutches shown and described, I do not limit myself thereto, as other forms of clutches might be used.

Operation: It will be noted that clutch D' works oppositely to clutch $C^2$, so that when the sprocket C is turned in a direction to propel the wheel, clutch $C^2$ locks the sprocket to the hub, while clutch D' is released, although it can then rotate freely within the sleeve with the hub and sprocket C. If the pedaling ceases, the hub and wheel may continue to revolve forward, as the clutch $C^2$ will release the sprocket C, and thus permit the rider to coast with his feet on the pedals. If the rider then desires to apply the brake, he starts to back-pedal, and upon so doing the cams C' D cause the sprocket C to impart a reverse motion to the clutch D' within the sleeve E, whereupon the clutch D' is locked to the sleeve, and thereupon the cams C', still working against the cams D, force the clutch D' and the sleeve E inward, away from the sprocket C, compressing spring F, and bringing the brake-ring E' into engagement with the bell-flange A', and as the sleeve E does not revolve the forcible contact of the stationary brake-ring against the flange A' on the hub will brake the wheel, and the braking will be more or less quick and powerful according to the back pressure applied on the pedals. When it is desired to release the brake, the pedals are simply moved so as to turn sprocket C forward again, which will cause clutch D' to disengage the sleeve E and the cams C' and D to shift relatively, so as to permit spring F to throw the sleeve outward, thereby disengaging the brake-ring E' from the flange A'. By using balls instead of rollers in clutch D' the friction is reduced and spring F can more easily shift the parts outward to disengage the brake-ring from the flange.

The device is compact and simple in construction, and its effectiveness in operation will be readily comprehended.

Having thus described my invention, what I claim, and desire to secure by Letters Patent of the United States, is—

1. The combination of the hub, the brake-flange thereon, a sleeve having a brake-ring adapted to engage the flange, means for preventing rotation of the sleeve but allowing it to move longitudinally of the hub, a cam-ring within the sleeve, a clutch for locking said ring to the sleeve, a sprocket on the hub, a clutch for locking said sprocket to the hub, and a cam on said sprocket adapted to engage said cam-ring when the motion of the sprocket is reversed, with a spring interposed between the sleeve and the base of the flange adapted to separate the brake-ring from the flange when the sprocket is turned forward.

2. The combination of the sectional hub having a flange on its inner end, a sleeve loosely mounted on said hub having an arm adapted to loosely engage the brace of the machine and prevent rotation of the sleeve, an adjustable brake-ring screwed on said sleeve and adapted to engage the flange, the adjusting jam-nut for said brake-ring, a clutch-ring loosely mounted on the hub within said sleeve and provided with clutches adapted to lock it to the sleeve when it is rotated backwardly, and the segmental cams attached to said clutch-ring; with a clutch-ring attached to the hub, the sprocket fitted over said clutch-ring and adapted to be locked thereto when propelled forwardly, the segmental cams on the inner side of said clutch-ring adapted to engage the segmental cams on the inner clutch-ring, and the spring interposed between said sleeve and the base of the flange, substantially as and for the purpose set forth.

3. The combination of a hub having a flaring or bell-shaped brake-flange, a sleeve loosely mounted on said hub so as to move longitudinally thereof and having an arm adapted to loosely engage a brace of the machine to prevent rotation of the sleeve, a brake-ring on said sleeve having a beveled face adapted to engage the beveled or inclined interior surface of said flange, a clutch-ring loosely mounted on the hub within said sleeve and adapted to be locked to the sleeve when it is rotated backwardly, and the segmental cams attached to said clutch-ring; with a clutch-ring attached to the hub, the sprocket fitted over said clutch-ring and adapted to be locked thereto when propelled forwardly, and the segmental cams on the inner side of said sprocket adapted to engage the segmental cams on the inner clutch-ring, all substantially as described.

4. The combination of a hub, a flaring flange thereon, a longitudinally-movable, non-rotatable sleeve on the hub within the flange, an exterior brake-ring on the inner end of said sleeve adapted to engage the inclined interior wall of said flaring flange, a cam-ring loosely mounted on the hub within the sleeve and provided with clutches adapted to lock it to the sleeve, a sprocket on the hub, clutch devices for locking said sprocket to the hub when the sprocket is turned forwardly, and cams on said sprocket adapted to engage other cams on said cam-ring within the sleeve, for the purpose and substantially as described.

5. The combination of the hub, the bell-shaped brake-flange thereon, a sleeve loosely mounted on the hub within the flange but non-rotatable therewith having an exterior brake-ring on its inner end adapted to engage the flange of the hub, a sprocket on the hub, a clutch for locking the sprocket to the hub, a cam on the side of the sprocket, and a cam-ring within the sleeve adapted to engage the cam on the sprocket when the sprocket is rotated backward, so as to move the sleeve and force the brake-ring into engagement with the brake-flange, a second clutch within the sleeve for locking said cam-ring to said sleeve, and the spring for releasing the brake when the sprocket is moved forward.

6. In a back-pedaling brake device, the combination with the hub having a flaring or bell-shaped flange thereon, a sleeve on said hub having on its inner end a beveled friction ring or surface extending into and adapted to engage the interior inclined wall of said flange; said sleeve being movable longitudinally of the hub but non-rotatable thereon, a spring normally tending to move the sleeve away from said flange, a sprocket-ring, and intermediate clutch mechanism, whereby the sleeve is forced inwardly against the pressure of said spring into binding contact with the flange when said sprocket is rotated in a backward direction only and means for locking the sprocket-ring to the hub to propel the wheel when the sprocket is rotated in a forward direction, substantially as described.

In testimony whereof I affix my signature in presence of two witnesses.

WILLIAM GEORGE SCHAEFFER.

Witnesses:
ALVIN J. SHARTLE,
FRED. STEPHAN, Jr.